United States Patent
Anton et al.

(10) Patent No.: US 8,912,249 B2
(45) Date of Patent: Dec. 16, 2014

(54) METHOD OF PREPARING ENCAPSULATED PIGMENT DISPERSIONS WHICH INCLUDE POLYURETHANE DISPERSIONS

(75) Inventors: Waifong Liew Anton, Wilmington, DE (US); Hee Hyun Lee, Wilmington, DE (US); Michael Joseph Otley, Hockessin, DE (US); Michael Stephen Wolfe, Wilmington, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 14/005,958

(22) PCT Filed: Dec. 15, 2011

(86) PCT No.: PCT/US2011/065011
§ 371 (c)(1),
(2), (4) Date: Sep. 18, 2013

(87) PCT Pub. No.: WO2012/148476
PCT Pub. Date: Nov. 1, 2012

(65) Prior Publication Data
US 2014/0011941 A1    Jan. 9, 2014

Related U.S. Application Data

(60) Provisional application No. 61/478,583, filed on Apr. 25, 2011.

(51) Int. Cl.
| | | |
|---|---|---|
| C09D 11/10 | (2014.01) |
| C09C 3/10 | (2006.01) |
| C08K 9/10 | (2006.01) |
| C09D 11/38 | (2014.01) |
| C09D 11/326 | (2014.01) |
| C09B 67/04 | (2006.01) |
| C09B 67/08 | (2006.01) |
| C09B 67/46 | (2006.01) |
| C09B 67/00 | (2006.01) |
| C09D 11/324 | (2014.01) |
| C09D 11/40 | (2014.01) |

(52) U.S. Cl.
CPC ............ *C09D 11/38* (2013.01); *C09D 11/326* (2013.01); *C09B 67/0002* (2013.01); *C09B 67/0013* (2013.01); *C09B 67/009* (2013.01); *C09B 67/0091* (2013.01); *C09B 67/0022* (2013.01); *C09D 11/324* (2013.01); *C09D 11/40* (2013.01)
USPC ........... 523/160; 523/206; 523/210; 524/501; 524/556; 524/560; 524/590

(58) Field of Classification Search
CPC ............ C08K 9/10; C09C 3/10; C09D 11/38; C09D 11/322; C09D 11/326
USPC ............................ 524/501; 523/206, 207, 210
See application file for complete search history.

(56) References Cited

U.S. PATENT DOCUMENTS

| | | |
|---|---|---|
| 4,501,852 A | 2/1985 | Markusch et al. |
| 4,701,480 A | 10/1987 | Markusch et al. |
| 5,022,592 A | 6/1991 | Zakheim et al. |
| 5,026,427 A | 6/1991 | Mitchell et al. |
| 5,085,698 A | 2/1992 | Ma et al. |
| 5,231,131 A | 7/1993 | Chu et al. |
| 5,679,138 A | 10/1997 | Bishop et al. |
| 5,746,818 A | 5/1998 | Yatake |
| 5,976,232 A | 11/1999 | Gore |
| 6,117,921 A | 9/2000 | Ma et al. |
| 6,262,152 B1 | 7/2001 | Fryd et al. |
| 6,306,994 B1 | 10/2001 | Donald et al. |
| 6,433,117 B1 | 8/2002 | Ma et al. |
| 6,450,632 B1 | 9/2002 | Tsang et al. |
| 7,524,892 B2 | 4/2009 | Kataoka et al. |
| 7,612,124 B2 | 11/2009 | Polk et al. |
| 7,737,196 B2 * | 6/2010 | Ganapathiappan ........... 523/160 |
| 7,741,384 B2 | 6/2010 | Liu |
| 2002/0044185 A1 | 4/2002 | Koitabashi et al. |
| 2003/0089277 A1 | 5/2003 | Zakheim et al. |
| 2004/0201658 A1 | 10/2004 | Jackson et al. |
| 2005/0090599 A1 | 4/2005 | Spinelli |
| 2007/0227401 A1 | 10/2007 | Ganschow et al. |
| 2008/0064786 A1 | 3/2008 | Tanaka et al. |

FOREIGN PATENT DOCUMENTS

EP    0556649 A1    4/1993

OTHER PUBLICATIONS

International Search Report for PCT/US2011/065011, dated Jun. 6, 2013.

* cited by examiner

*Primary Examiner* — Vu A Nguyen
(74) *Attorney, Agent, or Firm* — Simon L. Xu

(57) ABSTRACT

A process for encapsulating pigment dispersions is provided where a pigment is dispersed with a polymeric dispersant in an aqueous solvent system. An acrylate monomer and a polyurethane dispersion are added and the resultant mixture is polymerized. Optionally, the acrylate monomer/polyurethane mixture may be emulsified in water with an added surfactant or polymeric dispersant and up to 20% acrylic or other vinyl monomers based on the acrylate may be added to the acrylate monomer/polyurethane mixture before polymerization. Such encapsulated pigment dispersions may be used in inkjet inks and are stable to heat, aging test conditions, and solvent challenges. Prints from these inks have better durability.

22 Claims, No Drawings

METHOD OF PREPARING ENCAPSULATED PIGMENT DISPERSIONS WHICH INCLUDE POLYURETHANE DISPERSIONS

CROSS-REFERENCE TO RELATED APPLICATION

This application claims priority under 35 U.S.C. §119 from U.S. Provisional Application Ser. No. 61/478,583, filed Apr. 25, 2011 which is incorporated by reference in its entirety.

BACKGROUND OF THE DISCLOSURE

The present disclosure pertains to a process for preparing aqueous encapsulated pigment dispersions. These dispersions may be used in the preparation of aqueous inkjet inks, pigmented paints, and the like. More particularly, the disclosure relates to a dispersion process where a dispersed pigment is prepared, monomers and polyurethane dispersions are added to the dispersed pigment and polymerization is initiated to obtain an encapsulated pigment.

Dispersion methods are commonly used to disperse particles. A variety of dispersion processes have been described for dispersing particles. For inkjet inks pigments are dispersed with polymeric dispersants. Recently, processes have been described where the polymeric dispersed pigments are subject to a process that results in encapsulated pigments.

In U.S. Pat. No. 6,262,152 describes preparing encapsulated pigments where the encapsulation is achieved by using polymeric dispersants which have reactive sites and adding monomers that have substituents that can react with the reactive sites of the polymeric dispersant. For instance, the dispersant has isocyanate reactive groups and an isocyanate is added to react with the polymeric dispersant.

U.S. Pat. No. 7,524,892 describes an ink which has a copolymer dispersing agent and a polyurethane present. It also describes the use of a crosslinking agent that crosslinks based on carboxyl reactivity.

U.S. Pat. No. 7,612,124 describes polymer-enclosed color-imparting particles that are enclosed by a friable polymer formed from a water-dispersible polymerizable material.

U.S. Pat. No. 7,737,196 describes the use of a polyurethane derived from two monomers which passivates a pigment surface and is uniformly distributed on the surface. After the passivation step monomers are added and polymerized.

U.S. Pat. No. 7,741,384 describes an encapsulation process where both the pigment dispersion and the monomer dispersion are separately mixed utilizing a surfactant to independently stabilize the dispersion and the monomer.

US Patent Application Publication No. 200700227401 describes an encapsulation process where the monomer is stabilized via a miniemulsion which is stabilized by a hydrophobic organic compound.

US Patent Application Publication No. 20080064786 describes a water insoluble polymeric dispersant for the pigment and two crosslinking steps, the first occurring in a ketone/water solvent and crosslinks the core of the polymer followed by a second crosslinking for the shell of the polymer.

There have been efforts in the art directed at improving the stability of pigment dispersions. These efforts have included improvements in the processes used to make the dispersions, the development of new dispersants and the exploration of the interaction between dispersants and pigment particles, and between dispersants and the aqueous vehicle. While much of the effort has general application at improving dispersion stability, some of that effort has not found utility in particular applications. For example, the pigment dispersions used in inkjet printing applications have very unique and demanding requirements. It is critical that ink components comprising pigment dispersion remain stable, not only in storage but also over repeated jetting cycles. It is also desirable that the pigment dispersions offer good durability, good rub-fastness, wet-fastness and highlighter pen fastness. As the inkjet industry moves to page-wide array printing the requirements for repeating jetting cycles may be an order of magnitude higher than the traditional Small Office/Home Office market. These and other emerging needs require improved pigment dispersions.

A need exists for highly stable, higher-quality and different property inks for ink-jet applications. Although improvements in polymeric dispersants have significantly contributed to improved ink-jet inks, the current dispersants still do not provide inks with the requisite stability, durability, optical density and chroma needed for inkjet applications. The present invention satisfies this need by providing an encapsulated pigment dispersion based on a pigment which is stabilized by a structured polymeric dispersant to which is added polyurethanes, acrylate monomers and optionally acrylic monomers, which are, in turn, polymerized. This results in an encapsulated pigment that has more stability, better jetting without compromise of color properties.

SUMMARY OF THE DISCLOSURE

The present disclosure relates to encapsulating pigments for use in inkjet inks. The encapsulation is achieved by polymerizing monomers in the presence of polymerically dispersed pigments and a polyurethane dispersion where the polymeric dispersant is a random and structured polymer. Accordingly, a first method to prepare an encapsulated pigment comprising the steps of (a) dispersing a pigment using a polymeric dispersant in an aqueous vehicle wherein the polymeric dispersant is selected from the group consisting of acrylic dispersant comprising acrylic and acrylate monomers and polyurethane dispersant and mixtures thereof and wherein the polymeric dispersant has a number average molecular weight of 2000 to 9500 daltons;

(b) adding at least one encapsulation monomer and at least one polyurethane dispersion to the aqueous vehicle of step (a) to form a first dispersed pigment/polyurethane/encapsulation monomer/aqueous mixture and wherein the encapsulation monomer is comprised of acrylate monomers;

(c) dispersing the first dispersed pigment/polyurethane/encapsulation monomer/aqueous mixture using high shear mixing to form a second dispersed pigment/polyurethane/encapsulation monomer/aqueous mixture;

(d) polymerizing the encapsulation monomer by adding a polymerization initiator to the second dispersed pigment/polyurethane/encapsulation monomer/aqueous mixture.

Alternatively, a second method of making an encapsulated pigment comprising the steps of (a) dispersing a pigment using a first polymeric dispersant in an aqueous vehicle, wherein the polymeric dispersant is selected from the group consisting of acrylic dispersant comprising acrylic and acrylate monomers and polyurethane dispersant and mixtures thereof and wherein the first polymeric dispersant has a number average molecular weight of 2000 to 9500 daltons;

(b) preparing an aqueous emulsion comprising at least one encapsulation monomer, at least one polyurethane dispersion and a surfactant or a second polymeric dispersant, wherein the second polymeric dispersant comprises acrylic and acrylate monomers and wherein the encapsulation monomer comprises acrylate monomers;

(c) adding the aqueous emulsion of step (b) of the second method to the aqueous vehicle of step (a) to form a first dispersed pigment/polyurethane/encapsulation monomer/aqueous mixture;

(d) dispersing the encapsulation monomer/aqueous mixture using high shear mixing to form a second dispersed pigment/polyurethane/encapsulation monomer/aqueous mixture;

(e) polymerizing the encapsulation monomer by adding a polymerization initiator to the second dispersed pigment/polyurethane/encapsulation monomer/aqueous mixture.

The sequence of steps for both methods results in a stable encapsulated pigment where the polyurethane is at least partially incorporated into the encapsulated pigment.

The polymeric dispersants that can be used for dispersing the pigments are random or structured polymers commonly used for inkjet ink pigments. The polymeric dispersant for dispersing the pigments can be neutralized prior to, during or after the start of the dispersion process. The polymeric dispersants for the pigments may be an ionically stabilized dispersant. In the second method a surfactant or a polymeric dispersant is used with the monomers. The polymeric dispersant in the second method used with the monomers may be random or structured.

For both the first and second method additional monomers may be added prior to the polymerization step. These additional monomers may include acrylic monomers, acrylate monomers with nonionic components, vinyl acetate, styrene and other monomers that contain polymerizable double bonds and di- or tri-acrylates.

In accordance with another embodiment, there is provided an aqueous pigmented inkjet ink comprising an aqueous encapsulated pigment dispersion as described above in the two methods. The pigment inkjet ink has from about 0.1 to about 75 wt % pigment based on the total weight of the ink, a surface tension in the range of about 20 dyne/cm to about 70 dyne/cm at 25° C., and a viscosity of lower than about 30 cP at 25° C.

In still another embodiment, there is provided an ink set comprising at least one cyan ink, at least one magenta ink and at least one yellow ink, wherein at least one of the inks is an aqueous encapsulated pigmented inkjet ink as set forth above and described in further detail below. This ink set is often described as a CMY ink set.

In still another embodiment, there is provided an ink set comprising at least one cyan ink, at least one magenta ink, at least one yellow ink, and at least one black ink wherein at least one of the inks is an aqueous encapsulated pigmented inkjet ink as set forth above and described in further detail below. This ink set is often described as a CMYK ink set.

Other ink sets may include additional colors, as long as at least one of the inks is an aqueous encapsulated pigmented inkjet ink as set forth above and described in further detail below.

In yet another embodiment there is provided a method for inkjet printing onto a substrate, comprising the steps of:

(a) providing an inkjet printer that is responsive to digital data signals;

(b) loading the printer with a substrate to be printed;

(c) loading the printer with an ink as set forth above and described in further detail below, or an inkjet ink set as set forth above and described in further detail below; and (d) printing onto the substrate using the ink or inkjet ink set in response to the digital data signals.

These and other features and advantages of the present invention will be more readily understood by those of ordinary skill in the art from a reading of the following detailed description. One of skill can appreciate that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, references to values stated in ranges include each and every value within that range.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight. When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Unless it is otherwise stated or clear from the context, when discussing properties or components of an inkjet ink, the term "inkjet ink" may be understood to include inkjet ink sets.

When the term "about" is used in describing a value or an end-point of a range, the disclosure should be understood to include the specific value or end-point referred to.

As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

As used herein, the term "dispersion of pigment particles" is a stable dispersion of polymeric dispersed pigments which are normally used in inks and paints.

As used herein, the term "aqueous pigment dispersion" is an aqueous dispersion of pigments using polymeric dispersants.

As used herein, the term "dispersant" means a surface active agent added to a suspending medium to promote uniform and maximum separation of extremely fine solid particles often of colloidal size. For pigments, the dispersants are most often polymeric dispersants and usually the dispersants and pigments are combined using dispersing equipment.

As used herein, the term "structured polymer" means a polymer that is composed of segments that differ in composition from each other. Examples include diblock, triblock, graft and star polymers.

As used herein, the term "random polymer" means a polymer that is composed of monomers distributed in a random fashion in the polymer in much the same mole ratio of the monomers in the initial monomer composition.

As used herein, the term "ionically stabilized dispersions", ("ISD") are polymerically stabilized dispersions where the stabilization is due to ionic stabilization with little or no steric stabilization.

As used herein, the term "dispersible particles" are those particles that can be dispersed with dispersants including polymeric dispersants.

As used herein, the term "stable dispersion" means a particle dispersion where the particle size growth is less than 10% particle size growth and no flocculation when the dispersion is stored at room temperature for at least a week.

As used herein, the term "pigment" means any substance usually in a powder form which imparts color to another substance or mixture. Disperse dyes, white and black pigments are included in this definition.

As used herein, the term "drop" means a drop of liquid that is normally obtained from a laboratory dropper at room temperature and is normally about 0.04 grams for aqueous systems.

As used herein, the term "ambient conditions" refers to surrounding conditions, which are often around one atmosphere of pressure, about 50% relative humidity, and about 25° C.

As used herein, the term "encapsulation" means to encase a pigment in a polymeric system where the polymeric system is a product of polymerizing monomers in the presence of a pigment which is dispersed with a polymeric dispersant.

As used herein, the term "crosslinking" means the chemical reaction between reactive groups on at least two different chemicals, where one of the chemicals it at least disubstituted.

As used herein, the term "emulsion" means a stable mixture of two or more immiscible liquids held in suspension by small percentages of substances called emulsifiers.

As used herein, the term "miniemulsion" means dispersions of relatively stable oil droplets with a size in the 50 to 500 nanometer region prepared by shearing a system containing an oil, water, and a surfactant.

As used herein, the term "nonionic" means an oligomer or polymer derived from ethylene oxide and/or propylene oxide where there are at least 4 of the ethylene oxide or propylene oxide groups, As used herein, the term "binder" means a film forming ingredient in the inkjet ink. This binder is normally added when the ink is formulated.

As used herein, the term "HSD" means High Speed Dispersing.

As used herein, the term "OD" means optical density.

As used herein, the term "Gloss" means observation of reflected light from a printed surface, normally the printed substrate is glossy paper.

As used herein, the term "SDP" means a self-dispersible" or "self-dispersing" pigments.

As used herein, the term "free polymer", means the polymeric dispersant which is unbound to the pigment, and can be determined by gravimetric % solids on the supernatant of the sample, after the pigment is removed by centrifugation.

As used herein, the term "aqueous vehicle" refers to water or a mixture of water and at least one water-soluble organic solvent (co-solvent).

As used herein, the term "ionizable groups", means potentially ionic groups.

As used herein, the term "substantially" means being of considerable degree, almost all.

As used herein, the term "Mn" means number average molecular weight usually reported in daltons.

As used herein, the term "Mw" means weight average molecular weight usually reported in daltons.

As used herein, the term "Pd" means the polydispersity which is the weight average molecular weight divided by the number average molecular weight.

As used herein, the term "D50" means the particle size at which 50% of the particles are smaller; "D95" means the particle size at which 95% of the particles are smaller.

As used herein, the term "cP" means centipoise, a viscosity unit.

As used herein, the term "conductivity" means the property of a substance or mixture that describes its ability to transfer electricity and is reported as mS/cm.

As used herein, the term "pre-polymer" means the polymer that is an intermediate in a polymerization process, and can also be considered a polymer.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "PUD" means the polyurethane dispersions described herein.

As used herein, the term "GPC" means gel permeation chromatography.

As used herein, the term "ETEGMA//BZMA//MAA" means the block copolymer of ethoxytriethyleneglycol methacrylate, benzylmethacrylate and methacrylic acid.

As used herein, the term "NMP" means n-Methyl pyrrolidone.

As used herein, the term "THF" means tetrahydrofuran.

As used herein, the term "Tetraglyme" means Tetraethylene glycol dimethyl ether.

As used herein, the term "Vazo® 68" refers to a free radical source for polymerization; the product is obtained from DuPont, Wilmington Del.

As used herein, the term "Liponics EG-1" refers to a humectant obtained from Lipo Chemicals, Paterson, N.J.

As used herein, the term "PROXEL™ biocide" refers to a biocide obtained from Arch Chemicals, Norwalk, Conn.

As used herein, the term "Desmophen® 1200" refers to a slightly branched, hydroxyl-bearing polyester obtained from Bayer Material Science, Pittsburgh, Pa.

Unless otherwise noted, the above chemicals were obtained from Aldrich (Milwaukee, Wis.) or other similar suppliers of laboratory chemicals.

Encapsulated pigment particles with polyurethanes included in the encapsulation process offer an option to obtaining stable pigment particles for use in inkjet inks. The encapsulation process can result in a stabilized pigment with less polymer in the aqueous vehicle, which in turn can lead to inkjet ink formulation latitude. The encapsulated pigment can also lead to a more stable pigment dispersion and improved print properties such as durability and optical density. Surprisingly, the added polyurethanes seem to be incorporated into the encapsulated pigment, even though no specific reactive sites are designed into the polyurethane. That is, when the polymerization of the acrylate and optionally other vinyl monomers is done to encapsulate the pigment it is not expected that the polyurethane is chemically reacted into the polymerized vinyl compounds.

While seeking new encapsulated pigments, it was found that encapsulated pigments could be prepared by using random or structured polymers as the polymeric dispersants, with direct addition of mixtures of polyurethanes and monomers to the aqueous polymerically dispersed pigment, followed by polymerization of the monomers. Optionally, surfactants or a random or structured polymeric dispersant could be added to an aqueous mixture of the polyurethane and encapsulation monomers prior to the addition to the dispersed pigment. The random or structured polymers are made from acrylate and acrylic monomers.

The polymeric dispersant has a number average molecular weight of 2000 to 9500 daltons. Optionally, the molecular weight is 2000 to 6000 daltons.

The structured polymeric dispersant may be water soluble and may have a solubility of at least 10 grams of polymer/100 grams of water at 25° C. The solubility is measured in its neutralized form.

A subset of the random and structured polymer dispersants are ionically stabilized dispersants where the stabilization by the dispersant is ionic with little or any steric stabilization. These ionic polymeric dispersants were described in US Patent Application Publication No. 20050090599.

Pigments

Pigments suitable for use in the present invention are those generally well known in the art for aqueous inkjet inks. Representative commercial dry pigments are listed in U.S. Pat. No. 5,085,698. Dispersed dyes are also considered pigments as they are insoluble in the aqueous inks used herein.

Polymerically dispersed pigments are prepared by mixing the random or structured polymeric dispersants and the pigments and subjecting the mixture to dispersing conditions. It is generally desirable to make the stabilized dispersed pigment in a concentrated form. The stabilized pigment is first prepared by premixing the selected pigment(s) and the polymeric dispersant(s) in an aqueous carrier medium (such as water and, optionally, a water-miscible solvent), and then dispersing or deflocculating the pigment. The dispersing step may be accomplished in a 2-roll mill; media mill; a horizontal mini mill; a ball mill; an attrite; or by passing the mixture through a plurality of nozzles within a liquid jet interaction chamber at a liquid pressure of at least 5,000 psi to produce a uniform dispersion of the pigment particles in the aqueous carrier medium (microfluidizer) or an ultrasonicator. Alternatively, the concentrates may be prepared by dry milling the polymeric dispersant and the pigment under pressure. The media for the media mill is chosen from commonly available media, including zirconia, YTZ and nylon. Preferred are 2-roll mill, media mill, and by passing the mixture through a plurality of nozzles within a liquid jet interaction chamber at a liquid pressure of at least 5,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment.

A wide variety of organic and inorganic pigments, alone or in combination, may be selected to make the ink. The term "pigment" as used herein means an insoluble colorant which includes disperse dyes as they are insoluble in the inkjet ink. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much defloculation in the process of preparing the inks as pigments in dry form.

The dispersed pigment may be purified after the dispersion process by filtration, ultrafiltration or other processes used for purification of dispersed pigments.

Polymeric Dispersant

The polymeric dispersant for the pigment may be either a random or structured polymer. The polymer dispersant is a copolymer of hydrophobic and hydrophilic monomers. The hydrophobic monomers are acrylates and the hydrophilic monomers are acrylics. Alternatively, the polymeric dispersants may be polyurethanes.

Typical random polymeric dispersants have been described in U.S. Pat. No. 4,597,794.

The "structured polymer" can mean polymers having a block, branched, graft or star structure. Examples of structured polymers include AB or BAB block copolymers such as disclosed in U.S. Pat. No. 5,085,698; ABC block copolymers such as disclosed in EP Patent Specification No. 0556649; and graft polymers such as disclosed in U.S. Pat. No. 5,231,131. Other polymeric dispersants that can be used are described, for example, in U.S. Pat. Nos. 6,117,921, 6,262,152, 6,306,994 and 6,433,117.

Subsets of the random and structured polymeric dispersants described above are polymeric dispersants which stabilize the pigment with ionic stabilization and little if any steric stabilization. The ionically stabilized dispersions are designed to mimic self-dispersed pigments in that they are sensitive to salt in the dispersion. Dispersions from these ionic stabilized dispersants are characterized by a salt stability test. These ionically stabilized dispersion are the pigment dispersions used in step (a) of both method one and two described above.

Thus, the aqueous pigment dispersion used in step (a) comprises a pigment and a polymeric ionic dispersant in an aqueous vehicle, wherein:
 (a) the polymeric ionic dispersant is physically adsorbed to the pigment,
 (b) the polymeric ionic dispersant stably disperses the pigment in the aqueous vehicle,
 (c) the average particle size of the dispersion is less than about 300 nm, and
 (d) when the aqueous pigment dispersion is added to about 1.5 g of an aqueous sodium chloride solution of about 0.16 molar salt, in an amount of
  (i) 0.04 grams for pigment dispersions of about 10 wt % or more solids (based upon the total weight of the dispersion),
  (ii) 0.08 grams for pigment dispersions of about 5-10 wt % solids (based upon the total weight of the dispersion), and
  (iii) 0.12 grams for pigment dispersions of about 5 wt % or less solids (based upon the total weight of the dispersion),
the pigment precipitates out of the sodium chloride solution when observed after storing for 24 hours at room temperature. Normally the 0.04 grams is obtained by adding a single drop from a laboratory dropper into the test salt solution. The salt stability tests are done at ambient conditions.

Polymer dispersants suitable for use in the present invention generally comprise both hydrophobic and hydrophilic monomers. Some examples of hydrophobic monomers used in random polymers are methyl methacrylate, n-butyl methacrylate, 2-ethylhexyl methacrylate, benzyl methacrylate, 2-phenylethyl methacrylate and the corresponding acrylates. Examples of hydrophilic monomers are methacrylic acid, acrylic acid, dimethylaminoethyl(meth)acrylate and salts thereof. Also quaternary salts of dimethylaminoethyl(meth) acrylate may be employed.

Generally speaking the hydrophobic region is the part that contains the absorbing segment, which is the segment or function of the dispersant interacting with the pigment surface to effect dispersion. The hydrophilic segment is the segment that provides the stability of dispersion by interaction in the solute mixture to provide stabilization. This stabilization is characterized as steric stabilization or ionic stabilization. These phenomena were described by H Spinelli in Adv. Mater, 1998, 10, no. 15, page 1215 to 1218. The ionically stabilized polymeric dispersants described above have little if any steric stabilization.

The polymeric dispersant has a number average molecular weight of 2000 to 9500 daltons. Optionally, the molecular weight is 2000 to 6000 daltons.

The polymeric dispersant can be neutralized prior to the start of the dispersion process. That is, the initial mixture of solvent blend and polymer dispersant has an appropriate amount of neutralizing agent. Alternatively, the neutralizing agent may be added with the polar solvent during the dispersing process. An additional option is to have the polymeric dispersant partially neutralized in the initial mixture and add additional neutralizing agent in the polar solvent. The amount of neutralization of the polymeric dispersant in the final mixture is up to about 100% neutralized, and preferably up to about 90% neutralized.

The neutralizing agent can be hydroxides of the alkali metals, amines and the like. Examples of neutralizing agents include organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal inkjet printers.

Polyurethane Dispersions (PUDs)

In accordance with the present invention the term "polyurethane dispersion" refers to aqueous dispersions of polymers containing urethane groups and optionally urea groups, as that term is understood by those of ordinary skill in the art. These polymers incorporate hydrophilic functionality to the extent required to maintain a stable dispersion of the polymer in water.

The polyurethane dispersion can have one of two uses. It can be an additive which present when the encapsulation step occurs. It can also be used as a polymeric dispersant for the pigment.

The polyurethane dispersions are those in which the polymer is stabilized in the dispersion through incorporated ionic functionality, and particularly anionic functionality such as neutralized acid groups ("anionically stabilized polyurethane dispersion"). Further details are provided below.

Optionally the polyurethane can be considered a soluble polyurethane. This can occur when the combination of acid content, molecular weight, level of neutralization of the acid and the amount of hydrophilicity in the polyurethane occurs such that the polyurethane is soluble in the aqueous vehicle. The hydrophilicity may be provided by polyethylene oxide or polypropylene oxide groups in the polyurethane.

Such aqueous polyurethane dispersions are typically prepared by a multi-step process in which an isocyanate (N=C=O, NCO) prepolymer which has excess NCO groups is initially formed and subsequently chain terminated with a monofunctional isocyanate reactive group, or chain extended in the aqueous phase. For the urea terminated polyurethane it is the NCO prepolymer which is reacted with a primary or secondary amine to produce the urea termination of the polyurethane.

Typically, in the first stage of prepolymer formation, a diisocyanate is reacted with a compound chosen from isocyanate-reactive polyols and compounds containing one or more isocyanate-reactive groups and at least one acid or acid salt group to form an intermediate product. The molar ratio of the isocyanate groups to the isocyanate-reactive groups is such that the equivalents of isocyanate functionality are greater than the equivalents of isocyanate-reactive functionality, resulting in an intermediate product terminated by at least one NCO group. Thus, the molar ratio of isocyanate groups to isocyanate-reactive groups is at least about 1.01 to 1.4:1, optionally 1.05 to 1.25:1 and more suitably 1.1 to 1.15:1. As an example, diisocyanates are reacted with diols in the presence of other diols with ionic groups to produce an isocyanate-rich prepolymer which is then reacted further. In general, the isocyanates, and isocyanate reactive compounds can be combined in any convenient order.

Suitable diisocyanates for reacting with the isocyanate-reactive compound containing ionic groups (or groups which can be rendered ionic via, for example, neutralization) are those which contain either aromatic, cycloaliphatic or aliphatic-bound isocyanate groups.

Examples of suitable diisocyanates include cyclohexane-1,3- and -1,4-diisocyanate; 1-isocyanato-3-isocyanatomethyl-3,5,5-trimethyl-cyclohexane (isophorone diisocyanate or IPDI); bis-(4-isocyanatocyclohexyl)-methane; 1,3- and 1,4-bis-(isocyanatomethyl)-cyclohexane; 1-isocyanato-2-isocyanatonnethyl cyclopentane; bis-(4-isocyanatocyclohexyl)-methane; 2,4'-diisocyanato-dicyclohexyl methane; bis-(4-isocyanato-3-methyl-cyclohexyl)-methane, alpha,alpha,alpha',alpha'-tetramethyl-1,3- and/or -1,4-xylylene diisocyanate; 1-isocyanato-1-methyl-4(3)-isocyanatomethyl cyclohexane; and 2,4- and/or 2,6-hexahydrotoluoylene diisocyanate.

Additional diisocyanates may be linear or branched and contain 4 to 12 carbon atoms, optionally 4 to 8 carbon atoms and more suitably 6 carbon atoms, which include 1,4-tetramethylene diisocyanate; 1,6-hexamethylene diisocyanate; 2,2,4-trimethyl-1,6-hexamethylene diisocyanate; and 1,12-dodecamethylene diisocyanate. 1,6-hexamethylene diisocyanate are especially useful. Also useful is isophorone diisocyanate.

Isocyanate-reactive compounds containing acid groups, i.e., carboxylic acid groups, carboxylate groups, sulphonic acid groups, sulphonate groups, phosphoric acid groups and phosphonate groups, are chemically incorporated into the polyurethane to provide hydrophilicity and enable the polyurethane to be stably dispersed in an aqueous medium. The acid salts are formed by neutralizing the corresponding acid groups either prior to, during or after formation of the NCO prepolymer Isocyanate-reactive compounds containing carboxylic acids or carboxylic acid salts can be used.

Suitable compounds for incorporating carboxyl groups are described in U.S. Pat. Nos. 3,479,310, 4,108,814 and 4,408,008. The neutralizing agents for converting the carboxylic acid groups to carboxylate salt groups are described in the preceding U.S. patents and are also discussed hereinafter. Within the context of this invention, the term "neutralizing agents" is meant to embrace all types of agents which are useful for converting carboxylic acid groups to hydrophilic carboxylate salt groups.

Suitable carboxylic group-containing compounds are the hydroxy-carboxylic acids corresponding to the formula $(HO)_xQ(COOH)_y$ wherein Q represents a straight or branched hydrocarbon radical containing 1 to 12 carbon atoms, x is 1 or 2, and y is 1 to 3.

Examples of these hydroxy-carboxylic acids include citric acid, tartaric acid and hydroxypivalic acid.

Suitable acids are those of the above-mentioned formula wherein x=2 and y=1. These dihydroxy alkanoic acids are described in U.S. Pat. No. 3,412,054. Especially useful dihydroxy alkanoic acids are the alpha, alpha-dimethylol alkanoic acids represented by the structural formula:

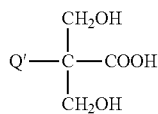

wherein Q' is hydrogen or an alkyl group containing 1 to 8 carbon atoms. The most suitable compound is alpha, alpha-dimethylol propionic acid, i.e., wherein Q' is methyl in the above formula.

The acid groups are incorporated in an amount sufficient to provide an ionic group content of at least about 15. The upper limit for the content of acid groups is generally about 75, expressed as acid number, mg KOH/gram of polyurethane. Optionally the upper limit of acid groups is an acid number of 60.

Suitable higher molecular weight polyols containing at least two hydroxy groups, which may be reacted with the other components to prepare the NCO prepolymers, are those having a molecular weight of about 400 to about 6000. The molecular weights are number average molecular weights (Mn) and are determined by end group analysis (OH number). Examples of these high molecular weight compounds include polyester polyols, polyether polyols, polyhydroxy polycarbonates, polyhydroxy polyacetals, polyhydroxy polyester amides and polyhydroxy polythioethers. A combination of the polyols can also be used in the polyurethane.

Suitable polyester polyols include reaction products of polyhydric, optionally dihydric alcohols to which trihydric alcohols may be added and polybasic, optionally dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, for example, by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., ethylene glycol; propylene glycol-(1, 2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerin and trimethylol-propane. The polyesters may also contain a portion of carboxyl end groups. Polyesters of lactones, for example, epsilon-caprolactone, or hydroxycarboxylic acids, for example, omega-hydroxycaproic acid, may also be used.

Polycarbonates containing hydroxyl groups include those known, per se, such as the products obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides or other means to obtain an alpha omega substituted diol. Especially useful polyether compounds are those that are derived from 1,3 to 1,12 diols. Examples of these include 1,3-propanediol, 1,4-butanediol, 1,8-octanediol and the like.

Other optional compounds for preparing the NCO prepolymer include low molecular weight, at least difunctional isocyanate-reactive compounds having an average molecular weight of up to about 400. Examples include the dihydric and higher functionality alcohols, which have previously been described for the preparation of the polyester polyols and polyether polyols.

In addition to the above-mentioned components which can be difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in special cases in which slight branching of the NCO prepolymer or polyurethane is desired. However, the NCO prepolymers should be substantially linear and this may be achieved by maintaining the average functionality of the prepolymer starting components at or below 2.1.

Process conditions for preparing the NCO prepolymers are well known by persons with skill in the art. The finished NCO prepolymer should have a free isocyanate content of about 1 to about 20%, optionally about 1 to about 10% by weight, based on the weight of prepolymer solids.

The polyurethanes are typical prepared by chain terminating or chain extending these NCO prepolymers.

The chain terminating agent is a primary or secondary amine which is added to form a urea termination. The amount of chain terminator employed should be approximately equivalent to the free isocyanate groups in the prepolymer, The ratio of active hydrogens in the chain terminator to isocyanate groups in the prepolymer can be in the range from about 1.0:1 to about 1.2:1, optionally from about 1.0:1.1 to about 1.1:1, on an equivalent basis. Although any isocyanate groups that are not terminated with an amine can react with water the ratios of chain termination to isocyanate group is chosen to assure a urea termination. Amine termination of the polyurethane is avoided by the choice and amount of chain terminating agent leading to a urea terminated polyether diol polyurethane which has better molecular weight control and better properties for use in encapsulated pigment systems.

Any primary or secondary monoamines reactive with isocyanates may be used as chain terminators. Aliphatic primary or secondary monoamines can be used effectively. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl)amine, diethylamine, bis(methoxyethyl)amine, N-methylstearyl amine and N-methyl aniline. An optional isocyanate reactive chain terminator is bis(methoxyethyl)amine. The bis(methoxyethyl) amine is part of a class of urea terminating reactants where the substituents are non reactive in the isocyanate chemistry, but have nonionic hydrophilic groups. This nonionic hydrophilic group provides the urea terminated polyether diol polyurethane with more water compatible.

The urea content in percent of the polyurethane dispersion which is chain terminated is determined by dividing the mass of chain terminator by the sum of the other polyurethane components including the chain terminating agent. The urea content will be from about 2 wt % to about 14.5 wt %. The urea content can be optionally from about 2.5 wt % to about 10.5 wt %.

It is important that this urea group be the terminating group and there are no substituents in the chain terminating group that can lead to crosslinking.

The NCO prepolymer may also be terminated with polyamine chain extenders.

Suitable polyamines for chain extension have an average functionality, i.e., the number of amine nitrogens per molecule, of 2 to 6. The desired functionalities can be obtained by using mixtures of polyamines containing primary or secondary amino groups. The polyamines are generally aromatic, aliphatic or alicyclic amines and contain between 1 to 30 carbon atoms. These polyamines may contain additional substituents provided that they are not as reactive with isocyanate groups as the primary or secondary amines. These same polyamines can be partially or wholly blocked polyamines.

The polyamines may include 1-amino-3-aminomethyl-3, 5,5-trimethylcyclohexane (isophorone diamine or IPDA), bis-(4-amino-cyclohexyl)-methane, bis-(4-amino-3-methyl-cyclohexyl)-methane, 1,6-diaminohexane, ethylene diamine, diethylene triamine, triethylene tetramine, tetraethylene pentamine and pentaethylene hexamine.

The amount of chain extender to be used in accordance with the present invention is dependent upon the number of terminal isocyanate groups in the prepolymer. The ratio of terminal isocyanate groups of the prepolymer to isocyanate-reactive groups of the chain extender is between about 1.0:0.6 and about 1.0:1.1. Any isocyanate groups that are not chain extended with an amine will react with water, which functions as a diamine chain extender.

Chain extension can take place prior to addition of water in the process, but typically takes place by combining the NCO prepolymer, chain extender, water and other optional components under agitation.

In order to have a stable dispersion, a sufficient amount of the acid groups must be neutralized so that the resulting polyurethane will remain stably dispersed in the aqueous medium. Generally, at least about 75%, optionally at least about 90%, of the acid groups are neutralized to the corresponding carboxylate salt groups.

Suitable neutralizing agents for converting the acid groups to salt groups either before, during or after their incorporation into the NCO prepolymers, include tertiary amines, alkali metal cations and ammonia. Examples of these neutralizing agents are disclosed in U.S. Pat. Nos. 4,501,852 and 4,701,480. Candidate neutralizing agents are the trialkyl-substituted tertiary amines, such as triethyl amine, tripropyl amine, dimethylcyclohexyl amine, and dimethylethyl amine.

Neutralization may take place at any point in the process. Typical procedures include at least some neutralization of the prepolymer, which is then chain extended in water in the presence of additional neutralizing agent.

The polyurethane has a number average molecular weight of 2,000 to 50,000 daltons.

The polyurethane dispersion is a stable aqueous dispersion of polyurethane particles having a solids content of polyurethane of up to about 75% by weight, optionally about 15 to about 60% by weight. However, it is always possible to dilute the dispersions to any minimum solids content desired. Solids content can be determined by gravimetric means and is presumed to be all polyurethane.

Crosslinked Polymeric Dispersant

The polymeric dispersant may be crosslinked after the pigment dispersion is prepared. This crosslinking step falls after Step (a) and before Step (b) in the method described above.

For crosslinking the polymeric dispersant is substituted with crosslinkable moieties which are selected from the group consisting of acetoacetoxy, acid, amine, epoxy, hydroxyl, blocked isocyanates and mixtures thereof. Then a crosslinking agent is added and the crosslinking of the polymeric dispersant occurs. The crosslinking agent is selected from a group consisting of acetoacetoxy, acid, amine, anhydride, epoxy, hydroxyl, isocyanates, blocked isocyanates and mixtures thereof. The crosslinking of the polymeric dispersant is done after the pigment is dispersed and before the encapsulation monomer is added. After the crosslinking step excess polymer can be removed by purification processes such as ultrafiltration.

Specific examples of crosslinking moiety/agent pairs are hydroxyl/isocyanate and acid/epoxy.

Monomers for Encapsulation

The monomers used for the encapsulation are acrylates and, optionally acrylics and other vinyl compounds. The acrylates are hydrophobic monomers and in general include, for example, benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, glycidyl acrylate, p-tolyl acrylate, sorbyl acrylate, ethoxytriethyleneglycol methacrylate, hydroxyethyl methacrylate, hydroxypropyl methacrylate, 2-ethoxyethyl methacrylate, hydroxyethyl acrylate, hydroxypropyl acrylate, di- and tri-methacrylates, and mixtures thereof.

Acrylic hydrophilic monomers can also be used as a monomer for the encapsulation. The amount of acrylic monomer is less than 20 weight percent of the acrylates. Hydrophilic monomers include, for example, methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate and mixtures thereof.

Acrylates with nonionic substituents may be included in the hydrophobic acrylate monomers. These nonionic components can be derived from ethylene oxide and propylene oxide and usually there are more than 3 of the ethylene oxide and propylene oxide groups. The total weight of these nonionic substituents is less than 20 weight percent based on the acrylates.

Other monomers may be used such as styrene, alpha-methyl styrene, substituted styrenes, N-alkyl acrylamides, N-alkyl methacrylamides, vinyl acetate, and vinyl butyrate and vinyl benzoate and mixtures thereof. The amount of these other vinyl group monomers can be used at less than 10 weight percent based on the acrylates.

Additional monomers used in the polymerization can include di(meth)acrylates and trimethacrylates.

The encapsulation monomers may contain mixtures of acrylates, acrylics, and vinyl monomers as described above.

Encapsulation Process

The encapsulation process occurs when the monomers are polymerized in the presence of the pigment which has been dispersed with a random or structured polymer. The polyurethane dispersion is also present when the encapsulation step is done. The encapsulated pigment has improved stability relative to a polymerically dispersed pigment that has not been encapsulated. When the encapsulated pigment is used in an inkjet ink the inks have better storage stability, improved performance in inkjet inks with aggressive solvent in the formulation, and the optical properties are comparable to the dispersed pigments that are not encapsulated. The durability of the prints from these encapsulated pigmented inks is excellent. These encapsulated pigments have utility in all inkjet printheads, including piezo and thermal printheads.

Prior to the encapsulation process, in method one, the monomers and the polyurethane dispersion are mixed into an aqueous mixture which contains the polymerically dispersed pigment. The monomers may have a compatibility with the polymerically dispersed pigment such that they are associated with the polymerically dispersed pigment prior to the polymerization. The polyurethane dispersion may also have a compatibility with the monomer/polymeric dispersion mixture. In this method the monomers and polyurethane dispersion may be mixed together prior to combining with the polymerically dispersed pigment. The mixing methods can include high sheer mixing.

In the second method the monomers and the polyurethane dispersion are mixed with surfactants or polymeric dispersants in water. The surfactants can include materials such as sodium dodecyl sulfate and the like. The polymeric dispersants used for the monomers and the polyurethane dispersions may be random or structured polymeric dispersants. These dispersants for the monomer/polyurethane mixture are similar to the polymeric dispersants described above for the pigment dispersants.

In both method one and two the monomers and the polyurethane dispersion are added to the aqueous mixture which contains the polymerically dispersed pigment. This aqueous mixture of the polymerically dispersed pigments, monomers and the polyurethane dispersion is mixed using high shear mixing. Examples of equipment for the high shear mixing includes a ultrasonicator, media mill, a horizontal mini mill, an attritor, or by passing the mixture through a plurality of nozzles within a liquid jet interaction chamber at a liquid pressure of at least 5,000 psi.

Following this high shear mixing that produces a mixture of the dispersed pigment, the monomers and the polyurethane dispersion, the polymerization of the monomers is initiated by addition of appropriate initiators which include peroxides, azo compounds and redox initiators. In the case of method two a dispersant or surfactant is also included in mixture prior to mixing the monomers with the dispersed pigment.

While not wishing to be bound by theory, the monomers and the polyurethane dispersion apparently have an affinity for the polymerically dispersed pigment such that the monomers can be polymerized. These polymerized monomers in conjunction with the dispersed pigment produce the encapsulated pigment. The polyurethane dispersion is at least partially incorporated into the encapsulated pigment. The properties of the encapsulated pigment may lead to the conclusion that the polymer from the added monomer must be in solid mixture which surrounds the pigment. For instance, polymerically dispersed pigments can have the polymeric dispersant displaced by a strong solvent such as butyl cellosolve. When the encapsulated pigment is challenged with a strong solvent it is stable relative to the polymerically dispersed pigment which has not been encapsulated. It is expected that the polymer derived from the monomers added is an independent polymer in the solid mixture that surrounds the pigment. Furthermore, the added encapsulated monomers are not chemically reacted with either the dispersant polymer or the polyurethane solids of the polyurethane dispersion. The dispersant polymer and the polyurethane solids of the polyurethane dispersion, by design, have no reactive sites with which the acrylate monomers can copolymerize. Disubstituted monomers can be used with the acrylate monomers to produce polymers with some branching.

Another way to observe the encapsulated pigment is to study the density of the encapsulated pigment before and after the encapsulation. One way to determine the density is to test the encapsulated pigment in a sucrose or similar chemical gradient. Different concentrations of sucrose in water are layered into a centrifuge tube and the encapsulated pigment is added. After centrifugation the encapsulated pigment will be at a level which reflects its density. The encapsulated pigment has lower density than the polymerically dispersed pigment.

The product of this process is a stable, dispersed pigment. This stable pigment dispersion is one that has less than 10% particle size growth and no flocculation when the dispersion is stored at room temperature for at least a week. More rigorous testing that entail accelerated testing by heating samples for a week or more can also be used to determine the stability of the particle dispersions. The optimal particle dispersion stability would depend on the particle characteristics and/or final use. Another criteria for a stable disperse particle is that it can be processed under the dispersing process conditions, not gel or have other adverse properties.

The encapsulated pigments of this invention demonstrate improved storage stability, improved stability when tested in a solvent challenge procedure. The inks derived from these encapsulated pigments perform better in extended jettability tests. The printed inks are more durable than those inks which contain pigments that are not encapsulated.

Dispersion of the Pigment Particles

The dispersing step for the polymerically dispersed pigment may be accomplished in an ultrasonicator, media mill, a horizontal mini mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). The media for the media mill is chosen from commonly available media, including zirconia, YTZ, and nylon. The media can be as small as about 0.1 microns, although particles larger than 0.3 microns are commonly used. These various dispersion processes are in a general sense well known in the art, as exemplified by U.S. Pat. Nos. 5,022,592, 5,026,427, 5,891,231, 5,679,138, 5,976,232 and US Patent Application Publication No. 20030089277. Preferred are media mill, and by-passing the mixture through a plurality of nozzles within a liquid jet interaction chamber at a liquid pressure of at least 5,000 psi. The mixing intensity required for the process is mixing normally associated with dispersion processes and not turbulent mixing of more modest mixing processes.

Combinations of dispersing equipment may be used. It may be more convenient to mix the solvent mixture, particle and polymeric dispersant in a High Speed Disperser (HSD) followed by milling in a media mill or a microfluidizer. The addition of the polar solvent may occur during the HSD portion of the processing and then the milling is continued in the media mill.

The final use of the particle dispersion may require that the solvent be removed from the particle dispersion mixture. The solvent may be removed by distillation processing, ultrafiltration or other convenient means. Any of these solvent removal methods may be incorporated into the process. The dispersing equipment and the solvent removal may be coupled and the solvent may be removed during the dispersing process and during the addition of the polar solvent.

One way to monitor the progress of the dispersion process is to measure the particle size and set a target value for the final D50 of the mixture. For typical pigments used for ink-jet inks the target value of the D50 is 125 nm or less, preferably less than 100 nm. Also the D95 and the particles smaller than 204 nm can be used as a test criteria for the pigment dispersions.

A wide variety of organic and inorganic pigments, alone or in combination, may be selected for dispersion by this process. The dispersed pigment may be used in paints, inks and especially inkjet inks. The term "pigment" as used herein means an insoluble colorant and in the present application includes disperse dyes. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form. Representative commercial dry pigments are listed in U.S. Pat. No. 5,085,698.

The dispersed pigment may be purified after the dispersion process by filtration, ultrafiltration or other processes used for purification of dispersed pigments.

Amounts/Ratios of the Ingredients

For inkjet inks the mass ratio of pigment to polymeric dispersant ranges from about 0.33 to about 400. This ratio is based on the mass of the pigment and that of the polymeric dispersant added to the dispersion. For organic pigments the ratio is about 0.33 to 12, optionally 0.5 to 10. For inorganic pigments the ratio is about 3 to about 400, optionally about 5 to about 200.

The ratio of encapsulation monomer to pigment for the encapsulating step is 0.1 to 10 based on the pigment and measured on a weight/weight basis. Thus, if there are 100 grams of pigment in a liter of aqueous dispersion, 10 to 1000 grams are added to the polymeric dispersion of the pigment prior to encapsulation. Optionally, the ratio of encapsulation monomer to pigment is 0.25 to 5.

The amount of the polyurethane solids is conveniently described relative to the amount of encapsulation monomer(s). The ratio of the polyurethane to encapsulation monomer is 0.1 to 10 based on the encapsulation monomer and measured on a weight/weight basis. Optionally, the ratio of polyurethane solids of the polyurethane dispersion to the encapsulation monomer(s) is 0.25 to 5.

In the case of organic pigments, the inkjet ink may contain up to approximately 30% of the encapsulated pigment, optionally about 0.1 to about 25%, and further from about 0.25 to about 15% pigment by weight based on the total ink weight. If an inorganic pigment is selected, the ink will tend to contain higher weight percentages of pigment than with comparable inks employing organic pigment, and the ink may be as high as about 75% in some cases, since inorganic pigments generally have higher specific gravities than organic pigments. Examples of inorganic pigments include titanium dioxide, iron oxides, and the like.

Inkjet Ink Components

Aqueous Carrier Medium

The aqueous carrier medium (aqueous vehicle) for the inkjet inks which utilize the encapsulated pigment described above is water or a mixture of water and at least one water-miscible organic solvent. Selection of a suitable mixture depends on requirements of the specific application, such as desired surface tension and viscosity, the selected pigment, drying time of the pigmented inkjet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol mono-methyl (or -ethyl)ether, diethylene glycol mono-methyl (or -ethyl)ether, propylene glycol mono-methyl (or -ethyl)ether, triethylene glycol mono-methyl (or -ethyl)ether and diethylene glycol di-methyl (or -ethyl)ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium. A mixture of water and butyl carbitol is also an effective aqueous carrier medium.

The amount of aqueous carrier medium in the ink is typically in the range of about 70% to about 99.8%, and preferably about 80% to about 99.8%, based on total weight of the ink.

The aqueous carrier medium can be made to be fast penetrating (rapid drying) by including surfactants or penetrating agents such as glycol ethers and 1,2-alkanediols. Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Other Additives

Other additives, such as biocides, humectants, chelating agents and viscosity modifiers, may be added to the ink for conventional purposes. Biocides may be used to inhibit growth of microorganisms. Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N",N"-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Other polymer additives to the ink, if used, can be soluble or dispersed polymer(s). They can be any suitable polymer, for example, soluble polymers may include linear homopolymers, copolymers, block polymers or natural polymers. They also can be structured polymers including graft or branched polymers, stars, dendrimers, etc. The dispersed polymers can include latexes, polyurethane dispersions, etc. The polymers may be made by any known process including but not limited to free radical, group transfer, ionic, RAFT, condensation and other types of polymerization. Useful classes of polymers include, for example, acrylics, styrene-acrylics, urethanes and alginates. These polymer additives are added at the time an ink is made, after any encapsulation is complete.

These polymer additives can be effective in improving gloss and other properties while not sacrificing optical density. Other properties that can be affected by the polymer additives include, for example, reliability for thermal inkjet printing and image durability.

Ink Properties

Drop velocity, separation length of the droplets, drop size and stream stability are greatly affected by the surface tension and the viscosity of the ink. Inkjet inks typically have a surface tension in the range of about 20 dyne/cm to about 70 dyne/cm at 25° C. Viscosity can be as high as about 30 cP at 25° C., but is typically somewhat lower. The ink has physical properties that can be adjusted to the ejecting conditions and printhead design. The inks should have excellent storage stability for long periods so as not clog to a significant extent in an inkjet apparatus. Further, the ink should not corrode parts of the ink-jet printing device it comes in contact with, and it should be essentially odorless and non-toxic.

Although not restricted to any particular viscosity range or printhead, lower viscosity inks can be used, and may be preferred for certain applications. Thus the viscosity (at 25° C.) of the inks can be less than about 7 cP, less than about 5 cP, or even less than about 3.5 cP.

The inkjet inks described herein may be jetted from any of the inkjet printheads, including drop-on-demand, piezo and thermal printheads. The printed substrates can include all types of paper, textiles, and hydrophobic surfaces.

Ink Sets

Ink sets suitable for use with the present invention comprise at least three primary color inks: a cyan ink, a magenta ink and a yellow ink (CMY). The ink set may optionally contain additional inks, and particularly a black ink (making a CMYK ink set). At least one of colors must have the pigment encapsulated by the process described above.

When the ink set contains a black ink, pigment is generally preferred for black from the standpoint of high optical density. A preferred black pigment is a carbon black pigment, and optionally an SDP black may be used. However, when the black is prepared by the inventive process the black ink will be a conventional black pigment with a polymeric dispersant and, in turn, encapsulated by polymerizing monomers.

The ink set may further comprise a fixing solution. See, for example, U.S. Pat. Nos. 5,746,818, 6,450,632, US Patent Application Publication No. 20020044185, EP Patent Specification No. 1258510 and US Patent Application Publication No. 20040201658.

EXAMPLES

The following examples illustrate the present invention without, however, being limited thereto. Tests listed here are those that are commonly used for testing pigment dispersions and inkjet inks.

The particle size for the pigment dispersions and the inks were determined by dynamic light scattering using a MICROTRAC UPA 150 analyzer from Honeywell/Microtrac (Montgomeryville Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution. Results are reported as D50 and D95 and particles less than 204 nm.

MW Characterization of the Polymeric Dispersants

Molecular weights of the polymers were determined by GPC using poly (methyl methacrylate) standards with tetrahydrofuran as the eluent. The molecular weight is routinely reported as number average molecular weight, Mn or optionally the weight average molecular weight Mw. The polymeric dispersants are not limited to Gaussian distribution of molecular weight, but may have other distributions such as bimodal distributions. Salt Stability Test to characterize dispersions which have ionically stabilized polymeric dispersants:

A series of different concentration aqueous salt solutions (typically NaCl) are prepared. For each salt solution, approximately 1.5 ml (about 1.5 g) is added to a small glass vial.

For a pigment dispersion "concentrate", one drop is added to the salt solution and gently mixed. For each of the tests ranges {10 wt % or more; 5 to 10 wt % and about 5 wt %} a drop weighs about 0.04 grams. The test for inks (which can be considered diluted forms of the concentrates) is very similar for the salt stability test for pigment dispersion concentrates, except that the solids content of inks is lower than that of a pigment dispersion concentrate, so the volume of ink added to the salt solution needs to be increased to maintain the same approximate amount of solids. Based on a typical ink of about 5 wt % total solids, about three times the weight of ink (as compared to concentrate) is needed. This test is carried out at ambient conditions.

Taking the case of the pigment dispersion concentrate mentioned above, the weight of solids from the concentrate would be about 0.006 g in about 1.5 g of the aqueous sodium chloride salt test solution, or about 0.4% by weight based on the weight of the aqueous salt test solution.

It should be noted that the 0.4% by weight number derived above is not critical for the application of the salt stability test, but can be used as a standard point if so desired. Because the results of the salt stability test are more related to the concentration of salt as compared to solids, and because it may be somewhat difficult to precisely determine the solids content of a pigment dispersion, for a standard of measurement the following convention will be adopted:

for pigment dispersions considered to be concentrates (about 10 wt % or more solids), one drop of dispersion should be used for 1.5 ml salt solution;

for more dilute pigment dispersions (such as inks having about 5 wt % solids or less), three drops of dispersion should be used for 1.5 ml salt solution; and for pigment dispersions of an intermediate solids content (inks and/or concentrates of about 5-10 wt % solids), two drops of dispersion should be used for 1.5 ml salt solution.

Based on the above, the appropriate amount of the pigment dispersion is added to the salt solution and gently mixed. After sitting undisturbed for 24 hours at room temperature, sample stability is rated as follows:

Rating of 3: complete settling of pigment; transparent, uncolored liquid at top.

Rating of 2: no transparent uncolored liquid layer; definite settling onto bottom of vial observed when vial is tilted.

Rating of 1: no transparent uncolored liquid layer; very slight settling (small isolated spots) as observed during tilting of vial.

Rating of 0: no evidence of any settling. The salt concentration where settling is definitely observed (a rating of 2 or 3) is taken as the critical flocculation concentration for the pigment dispersion. It can be inferred from this test that, with increasing critical flocculation concentration, the role of polymeric (steric) stabilization becomes more dominant and electrostatic stabilization becomes a less important stabilization mechanism.

The ionically stabilized polymer dispersants which satisfy the requirements for the invention are those that give pigment dispersions that are rated at 2 or 3 at a concentration of salt of 0.16 molar. That is, ISD polymer dispersants of this invention, when associated with a pigment in an ISD, and when tested by the salt stability test, will be observed to precipitate from the test solution at 0.16 molar salt concentration. Rating criteria 2 and 3 will each meet the criteria of precipitation.

The salts used for the aqueous salt solution are lithium, sodium or potassium salts, with sodium chloride being preferred. The salt stability test is primarily used to test the non-encapsulated pigment dispersion that is used at step (a) in method one and two.

The inks were tested by printing on various substrates with HP printers. Plain paper, glossy paper and brochure paper were tested. The jettability of the inks over a long print cycle was done by printing from an HP45 printhead. The amount of ink from each drop was measured periodically and the test design was to eject up to 50 mLs of ink for each ink. The quality of this jettability was judged by the total number of mLs of ink jetted, the stability of the amount jetted and the variability of the amount jetted.

The optical density was measured using a Greytag-Macbeth SpectroEye™ instrument (Greytag-Macbeth AG, Regensdorf, Switzerland).

The durability of the image towards highlighter smear was done using a Faber-Castel highlighter pen after the printed image was allowed to dry for one hour after printing. The image was marked twice, the first mark was with a single pass with the highlighter and the second mark was with two passes with the highlighter. The amount of ink transfer into the unprinted area by the highlighter pen and damage to the image was noted by visual inspection and rated on a scale of 0 to 5 with 5 being best. The 5 rating has no smearing of and no damage to the printed image with the highlighter.

Examples

Dispersant Polymer 1 (Structured Polymer, Triblock) ETEGMA//BZMA//MAA 3.6//13.5//10.8

A 3-liter flask was equipped with a mechanical stirrer, thermometer, $N_2$ inlet, drying tube outlet, and addition funnels. Tetrahydrofuran THF, 291.3 gm, was charged to the flask. The catalyst tetrabutyl ammonium m-chlorobenzoate, 0.44 ml of a 1.0 M solution in acetonitrile, was then added to the flask. Initiator, 1,1-bis(trimethylsiloxy)-2-methyl propene, 20.46 gm (0.0882 moles) was injected into the flask. Feed I [tetrabutyl ammonium m-chlorobenzoate, 0.33 ml of a 1.0 M solution in acetonitrile and THF, 16.92 gm] was started and added over 185 minutes. Feed II [trimethylsilyl methacrylate, 152.00 gm (0.962 moles)] was started at 0.0 minutes and added to the flask over 45 minutes. One hundred and eighty minutes after Feed II was completed (over 99% of the monomers had reacted) Feed III [benzyl methacrylate, 211.63 gm (1.20 moles) was started and added over 30 minutes. Forty minutes after Feed III was completed (over 99% of the monomers had reacted) Feed IV methacrylate, 78.9 gm (0.321 moles) was started and added over 30 minutes.

At 400 minutes, 73.0 gm of methanol and 111.0 gm of 2-pyrrolidone was added to the above solution and distillation began. During the first stage of distillation, 352.0 gm of material was removed. Then more 2-pyrrolidone 340.3 gm was added and an additional 81.0 gm of material was distilled out. Finally, 2-pyrrolidone, 86.9 gm total, was added.

The polymer has a composition of ETEGMA//BZMA//MAA 3.6//13.5//10.8. It has a molecular weight of Mn=4,200, acid value 162.

Dispersant Polymer 2 (Structured Polymer Diblock) 13BZMA//10MAA

A 3-liter flask was equipped with a mechanical stirrer, thermometer, $N_2$ inlet, drying tube outlet, and addition funnels. Tetrahydrofuran THF, 291.3 gm, was charged to the flask. The catalyst tetrabutyl ammonium m-chlorobenzoate, 0.44 ml of a 1.0 M solution in acetonitrile, was then added to the flask. Initiator, 1,1-bis(trimethylsiloxy)-2-methyl propene, 20.46 gm (0.0882 moles) was injected into the flask. Feed I [tetrabutyl ammonium m-chlorobenzoate, 0.33 ml of a 1.0 M solution in acetonitrile and THF, 16.92 gm] was started and added to the flask over 185 minutes. Feed II [trimethylsilyl methacrylate, 152.00 gm (0.962 moles)] was started at 0.0 minutes and added to the flask over 45 minutes. One hundred and eighty minutes after Feed II was completed (over 99% of the monomers had reacted) Feed III [benzyl methacrylate, 211.63 gm (1.20 moles) was started and added to the flask over 30 minutes. Forty minutes after Feed III was completed (over 99% of the monomers had reacted).

At 400 minutes, 73.0 gm of methanol and 111.0 gm of 2-pyrrolidone was added to the above solution and distillation began. During the first stage of distillation, 352.0 gm of material was removed. Then more 2-pyrrolidone 340.3 gm was added and an additional 81.0 gm of material was distilled out. Finally, 2-pyrrolidone, 86.9 gm total, was added.

The polymer has a composition of BZMA//MAA 13//10.

Dispersant Polymer 3 Polyurethane 1 (DEA terminated TMXDI/UH-50/DMPA)

To a dry, alkali- and acid-free, 2 liter flask equipped with an additional funnel, a condenser and a stirrer, under a nitrogen atmosphere was added Eternacoll® UH-50 (117.0 g), dimethylol propionic acid (87.0 g) and Sulfolane (220.0 g). The contents were heated to 115° C. and mixed under a nitrogen gas purge for 30 minutes. The temperature was then lowered to 60° C. and DBTDL (0.08 g) was added followed by TMXDI (238.0 g) via the addition funnel. The residual TMXDI in the additional funnel was rinsed into the flask with Sulfolane (15.0 g). The stirred reaction mass was allowed to exotherm. When exotherm began to slow, the temperature was maintained at 100° C. while monitoring the isocyanate content until it reached 1.06%. The temperature was lowered to 60° C. To the flask was added DEA (18.04 g) via the additional funnel followed by rinsing the residual BMEA in additional funnel into the flask with Sulfolane (5.0 g). The mixture was maintained at 60° C. for 90 minutes. A solution of 45% KOH in water (56.56 g) and additional de-ionized water (776.87 g) were added over a period of 5 minutes to give a 70% neutralized polyurethane resin in water. This was allowed to stir and cool to room temperature to provide a polyurethane dispersion with 27.49% of solids and a measured acid number of 79.03 mg KOH/gram polymer.

Polyurethane Dispersion 1 Used for Encapsulation Examples 1 and 2

To a dry, alkali- and acid-free flask, equipped with an addition funnel, a condenser, stirrer and a nitrogen gas line was added 635.5 g Desmophen C 1200, a polyester carbonate diol, (Bayer), 697.06 g methylethyl ketone (MEK), 64.04 g DMPA, and 0.103 g DBTL. The contents were heated to 80° C. and mixed until a clear solution was produced. To this was added 194.15 g IPDI via the addition funnel at 80° C. over 30 min. The addition funnel was rinsed with 29.78 g MEK to capture any residual IPDI. This rinse was added to the reactor.

The reaction temperature was maintained at 80° C. for 60 minutes with care not to exceed 90 C. Samples were drawn for measurement of NCO %, by titration, until 0.44% NCO was achieved. 4.56 grams of 1,2-Ethylene diamine (EDA) was then added over 10 minute by way of the addition funnel. The reactor was held at 80 C for 10 minutes when 10.38 g Bis methoxyethyl amine (BMEA) was added through the same addition funnel. The isocyanate level was followed by IR until the isocyanate was fully consumed.

The polyurethane dispersion was found to be 59.03% solids in MEK, with an acid number of 30 and a GPC molecular weight (Mn) of 28,800 and PDI=2.0. This polyurethane dispersion was chain extended.

Polyurethane Dispersion 2 Used for Encapsulation Example 3

A 3 L jacketed, kettle was loaded with 329.5 g Terathane® 650 (0.502 mol), 486.9 g Sulfolane, and 95.0 g dimethylol propionic acid (0.709 mol). The mixture was heated 70° C. with N2 purge. Then, 0.5 g dibutyl tin dilaurate was added. Over 2 minutes 289.7 g isophorone diisocyanate (1.30 mol) was added. The reaction exothermed to 80 C over 20 minutes and was held at 80° C. for a total of 5 hrs when the % NCO was 0.74%. Then, 24.8 g bis(2-methoxy ethyl)amine was added over 10 minutes. After 1 hr at 80° C., the polyurethane solution was inverted under high speed mixing by adding a mixture of 45% KOH (79.4 g) and 1112.5 g water followed by additional 582.2 g water. The polyurethane dispersion had a viscosity of 23.3 cPs, 24.23% solids, pH of 7.61, and molecular weight by GPC of Mn 7038, Mw 16453, and Pd 2.34. The urea content is 3.3%. This polyurethane dispersion was chain terminated.

Pigment Dispersions

The pigmented dispersions were prepared using a two-step process involving a first mixing step followed by a second grinding step. The first step comprises mixing of all the ingredients, that is, pigment, dispersants, liquid carriers, neutralizing agent, and any optional additives to provide a blended "premix". Typically all liquid ingredients were added first, followed by the neutralizing agent, then the dispersants, and lastly the pigment. Mixing was done in a stirred mixing vessel, and a high-speed disperser (HSD) was used for the mixing step. A Cowels type blade was attached to the HSD and was operated at from 500 rpm to 4000 rpm, which provided optimal shear to achieve the desired mixing. Adequate mixing was usually achieved after mixing under the conditions described above for a period of from 15 to 120 minutes to obtain the premix mixture.

The second step was grinding of the premix to produce a pigmented dispersion. A lab-scale Eiger Minimill (Model M250, VSE EXP) manufactured by Eiger Machinery Inc., Chicago, Ill. was employed. Grinding was accomplished by charging about 820 grams of 0.5 YTZ® zirconia media to the mill. The mill disk was operated at a speed between 2000 rpm and 4000 rpm, and typically between 3000 rpm and 3500 rpm. The dispersion was processed using a re-circulation grinding process with a typical flow rate through the mill at between 200 to 500 grams/minute, and more typically at 300 grams/minute. The milling may be done using a staged procedure in which a fraction of the solvent is held out of the grind and added after milling is completed. This is done to achieve optimal rheology that maximizes grinding efficiency. The amount of solvent held out during milling varies by dispersion, and is typically between 200 to 400 grams for a batch size with a total of 800 grams. Typically, the dispersions of the present invention were subjected to a total of 4 hours of milling.

For black dispersions, an alternate milling process using a Microfluidizer was used. Microfluidization is a non-media milling process in which milling is done by pigment impingement through nozzles under high pressures. Typically, pigment dispersions were processed at 15,000 psi with a flow rate of 400 grams/minute for a total of 12 passes through the mill. In making the black dispersions in the Examples, a lab-scale (Model M-110Y, available from Microfluidics of Newton, Mass.) high pressure pneumatic Microfluidizer with a diamond Z Chamber was employed.

Alternatively, the pigment dispersion for step (a) was prepared using a solvent milling process, in which 6 parts of an un-neutralized dispersant were combined with 16 parts of a pigment in 50 parts of water and 27.5 parts of a solvent (methyl ethyl ketone), and sufficient KOH to neutralize the dispersant to a degree of 90%. This premix was dispersed in a High Speed Disperser (HSD) at 2000 rpm for 2 hours. The resulting premix was sufficiently milled to achieve an acceptable particle size. The milled dispersion was then distilled at 67° C. under vacuum to remove the solvent.

Preparation of Pigmented Dispersion K1

The following procedure was used to prepare a black pigmented dispersion using Nipex 180 and Dispersant 1. Using an microfluidizer, a premix was prepared at typically 20-30% pigment loading and the targeted dispersant level was selected at a pigment/dispersant (P/D) ratio of 2.0. A P/D of 2.0 corresponds to a 40% dispersant level on pigment. A co-dispersant, Surfynol 104 in Dowanol DPM at a P/D=100 was added to the total dispersion formulation to facilitate wetting of pigment and dissolution of dispersant in the premix stage for ease of grinding during milling stage. Dispersant 1 was pre-neutralized with KOH to facilitate solubility and dissolution into water. An additional 6.91 g of a 45% KOH solution in water was added. During the premix stage and milling stage, de-ionized water (1200 g) was added to adjust viscosity and control temperature. After completion of the milling stage, the remaining letdown of de-ionized water (450.0 g) was added and thoroughly mixed. The final pigment dispersion contains 23.15% of solids.

The pigment dispersion was purified using an ultrafiltration process to remove co-solvent(s) and excess dispersant, and filter out other impurities that may be present. After completion, the pigment level in the dispersion was reduced to 10 to 15%. A single black dispersion was prepared using the Polyurethane Dispersant 1.

| Pigmented Dispersion | Pigment | Pigment/ Dispersant | Polyurethane Dispersant No. | Particle Size | |
|---|---|---|---|---|---|
| | | | | D50 (nm) | D95 (nm) |
| K1 | Nipex 180 | 2 | 1 | 107 | 185 |

Preparation of Cross-linked Pigment Dispersion XL-K1

In the cross-linking step, Denacol® 321 was mixed with one of the pigmented Dispersion K1, and heated at temperatures between 60° C. and 80° C. with efficient stirring for 6-8 hours. After the cross-linking reaction was completed, the pH was adjusted to at least about 8.0 if needed. The composition of the cross-linked Pigment Dispersion XL-K1 is summarized below.

| Cross-linked Dispersion | Pigmented Dispersion | Cross-linkable Moiety | Cross-linking Compound |
|---|---|---|---|
| XL-K1 | K1 | COOH, OH | Denacol ® 321 |

Encapsulation Example 1

Nipex 180 dispersion was prepared by two step milling method described above using acrylic dispersant polymer 1 ETEGMA//BZMA//MAA 3.6//13.5//10.8. The final pigment to dispersant ratio was 2.5. 4.46 gram of Polyurethane Dispersion 1 (mass measured as the polyurethane solids) and 0.89 gram of dispersant polymer 1 were dispersed in 73.03 gram of water. 4.46 gram of ETEGMA was dispersed in 78.38 gram of the water solution of polyurethane 1 and dispersant polymer 1 by sonicating for 6 min (2 sec on, 4 sec off) in ice bath. This encapsulation monomer emulsion was added into 117.18 gram of the black dispersion, and magnetic stirred for 5 min. This mixture of pigment dispersion and encapsulation monomer mixture was also sonicated for 30 min (2 sec on, 4 sec off) in ice bath with 30% of full power. The particle size data after sonication are D50 100.3 nm and D95 159.2 nm.

The sonicated mixture was transferred to 250 ml reactor equipped with an agitator and a condenser. The reactor was then heated to 82° C. 9.98 gram of 2.5% water soluble initiator, Vazo® 68 was then charged for an hour and polymerized at 82° C. for additional two hours. The particle size data after polymerization are D50 105.7 nm and D95 162.6 nm. This example corresponds to method 2.

Encapsulation Example 2

Nipex 180 dispersion was prepared by two step milling method described above using acrylic dispersant polymer 1 ETEGMA//BZMA//MAA 3.6//13.5//10.8. The final pigment to dispersant ratio was 2.5. 4.55 gram of Polyurethane Dispersion 1 (mass measured as the polyurethane solids) was dispersed in 71.2 gram of water. This polyurethane solution was added into 119.71 gram of the black dispersion and magnetic stirred for 10 min. 4.55 gram of ETEGMA was added in 195.46 gram of the mixture of polyurethane 1 water solution and the black dispersion, and magnetic stirred for 10 min. This mixture of pigment dispersion, preformed polyurethane 1 and encapsulation monomer mixture was also sonicated for 30 min (2 sec on, 4 sec off) in ice bath with 30% of full power. The particle size data after sonication are D50 98.2 nm and D95 172.6 nm. This example corresponds to method 1.

The sonicated mixture was transferred to 250 ml reactor equipped with an agitator and a condenser. The reactor was then heated to 82° C. 9.99 gram of 2.5% water soluble initiator, Vazo® 68 was then charged for an hour and polymerized at 82° C. for additional two hours. The particle size data after polymerization are D50 104.6 nm and D95 162.2 nm.

Encapsulation Example 3

E-02 (magenta) dispersion was prepared by solvent milling method described above using acrylic dispersant polymer 2 BzMA//MAA 13//10 so that pigment to dispersant ratio to be 4.0. 3.88 gram of Polyurethane Dispersion 2 (mass measured as the polyurethane solids) and 0.075 gram of Sodium bicarbonate (NaHCO3) were dispersed in 57.94 gram of water. The encapsulation monomer mixture was made by mixing 3.88 gram ETEGMA, 0.078 gram MAA and 0.16 gram Triethyleneglycol dimethacrylate. The 4.12 gram encapsulation monomer mixture was dispersed in 61.90 gram of the preformed polyurethane 2 and sodium bicarbonate water solution by sonicating for 6 min (2 sec on, 4 sec off) in ice bath. This encapsulation monomer emulsion was added in 133.5 gram of the E-02 dispersion, and magnetic stirred for 10 min.

This mixture of pigment dispersion and encapsulation monomer mixture was also sonicated for 30 min (2 sec on, 4 sec off) in ice bath with 30% of full power. The particle size data after sonication are D50 93.1 nm and D95 199.9 nm.

The sonicated mixture was transferred to 250 ml reactor equipped with an agitator and a condenser. The reactor was then heated to 82° C. 10.45 gram of 2.5% water soluble initiator, Vazo® 68 was then charged for an hour and polymerized at 82° C. for additional two hours. The particle size data after polymerization are D50 114 nm and D95 215.4 nm. This example corresponds to method 2.

Encapsulation Example 4

In a manner similar to Encapsulation Example 1 to the crosslinked pigment dispersion XL-K1 was added a monomer mixture of ETEGMA/BZMA/Triethyleneglycol dimethacrylate at a 40/10/2 weight ratio along with a polyurethane with an acid number of 30 and a Mn of 9700.

Comparable Ink Example 1, Ink Formulated with Nipex 180 Dispersion (not Encapsulated and No Polyurethane Dispersion Present)

Nipex 180 dispersion was prepared by two step milling method described above using acrylic dispersant polymer 1 ETEGMA//BZMA//MAA 3.6//13.5//10.8. The final pigment to dispersant ratio was 2.5. Ink was formulated so that it has 3% pigment loading using the Nipex180 dispersion.

Comparable Ink Example 2, Monomers and
Polyurethane Mixed and Polymerized Prior to
Mixing with Pigment Dispersion Nipex 180 dispersion was prepared by two step milling method described above using acrylic dispersant polymer 1 ETEGMA//BZMA//MAA 3.6//13.5//10.8. The final pigment to dispersant ratio was 2.5.

9.67 gram of preformed polyurethane 1 and 1.93 gram of dispersant polymer 1 were dispersed in 177.93 gram of water. 9.67 gram of ETEGMA was dispersed in 189.53 gram of the water solution of polyurethane 1 and dispersant polymer 1 by sonicating for 15 min (2 sec on, 4 sec off) in ice bath. The sonicated mixture was transferred to 250 ml reactor equipped with an agitator and a condenser. The reactor was then heated to 82° C. 10.79 gram of 2.5% water soluble initiator, Vazo® 68 was then charged for an hour and polymerized at 82° C. for additional two hours. The product is a combination of a polyurethane dispersion and polymerized monomers and as such can be called a binder that can be added to an ink.

Ink was formulated so that it has 3% pigment loading using the Nipex180 dispersion and 1.5% of this free binder.

Testing of Pigment Dispersions

The particle size as D50 and D95 were measured before and after the polymerization step. The stability of the dispersions was rated primarily on the particle size growth after storing the dispersion samples at 70° C. for seven days.

TABLE 1

Particle size data before and after polymerization

| | D50(Before polymerization) | D95(Before polymerization) | D50(After polymerization) | D95(After polymerization) |
|---|---|---|---|---|
| Encapsulation Example 1 | 100.3 nm | 159.2 nm | 105.7 nm | 162.6 nm |
| Encapsulation Example 2 | 98.2 nm | 172.6 nm | 104.6 nm | 162.6 nm |

TABLE 1-continued

Particle size data before and after polymerization

| | D50(Before polymerization) | D95(Before polymerization) | D50(After polymerization) | D95(After polymerization) |
|---|---|---|---|---|
| Encapsulation Example 3 | 93.1 nm | 199.9 nm | 114 nm | 215.4 nm |

The particle size is substantially the same after the monomers are polymerized.

Ink Examples

The inventive encapsulated pigment dispersions were formulated into inventive inks 1-3. The comparable inks 1 and 2 listed below are made with the pigment dispersions that were used to make the inventive encapsulated pigment dispersions. The inks had the following formulation with a 3 weight % pigment loading.

| 1,2-Hexandiol | 2 wt % |
|---|---|
| Glycerol, | 6 |
| Liponics EG-1, | 5 |
| 2-Pyrrolidinone | 5, |
| Ethylene Glycol | 5 |
| SURFYNOL ® 465 | 0.5 |
| PROXEL ™ biocide | 0.2, |
| Balance, water. | |

The tests performed on the inks included jetting, oven stability and solvent challenge. The inks were printed onto brochure paper and prints tested for durability and optical density. The jetting was tested by a pen life test which prints up to 50 mL of ink from an HP45 pen. The amount of ink jetted ink is measured periodically. High jetting volume and consistency of the jetting volume is reported. The durability is observed by testing for highlighter smear with one or two smear tests indicated as 1× and 2× in the table. Oven stability is tested by putting in an oven at 70° for seven days.

TABLE 2

Ink properties; particle sizes

| Examples formulated into an ink | D50(After polymerization and formulated into ink) | D95(After polymerization and formulated into ink) | D50 (Ink aged for 7 days for 70° C. oven) | D95 (Ink aged for 7 days for 70° C. oven) | Stability of dispersion |
|---|---|---|---|---|---|
| Ink Example 1 | 112 nm | 177 nm | 108 nm | 180 nm | Excellent |
| Ink Example 2 | 105 nm | 199 nm | 110 nm | 172 nm | Excellent |
| Ink Example 3 | 138 nm | 261 nm | ND | ND | Very good |
| Comparative Ink Example 1 | 111 nm | 174 nm | 111 nm | 172 nm | ND |
| Comparative Ink Example 2 | 238 nm | 575 nm | 209 nm | 389 nm | ND |

ND: not determined

The inventive inks have substantially the same particle size before and after 70° C./7 day aging tests. This demonstrates that these inks with the encapsulated pigments are substantially stable.

TABLE 3

| | Jetting | Durability Brochure paper | OD Brochure paper | Ink Conductivity | Ink Viscosity (cP) | Oven Stability (70° C., 7 d) |
|---|---|---|---|---|---|---|
| Ink Example 1 | Excellent Drop volume sustained with low variability | 5.0(1x), 5.0 (2x) | 1.88 | 1.14 | 3.64 | Very good D50-4%; D95 2% |
| Ink Example 2 | Excellent Drop volume sustained with low variability | 5.0(1x), 4.5(2x) | 1.9 | 1.21 | 4 | Very good D50 5%; D95-14% |
| Ink Example 3 | Very good Drop volume sustained with low variability | 5.0(1x), 4.0(2x) | 1.72 | 1.25 | 4.28 | ND |
| Comparable Ink Example 1 | Poor Declined drop volume in jetting | 0.5(1x), 0.5(2x) | 2.02 | 0.71 | 3.19 | Very good D50 0%; D95-1% |
| Comparable Ink Example 2 | Poor Significant decline in jetting | 5.0(1x), 5.0(2x) | 1.81 | 0.98 | 7.03 | ND |

The inventive inks derived from the encapsulated pigments all performed well in these tests. These are especially good in the jetting test, and the oven stability when compared to the dispersed pigments that had not been encapsulated.

Ink Example 4 was also tested. The ink had the following properties: pH, 7.82; surface tension, 38.1; viscosity at 25°, 1.023; D50, 115 nm and D95 209 nm. Using an Epson 980 printer there were no nozzle outs after 30 pages of printing. On HP brochure paper the OD was 1.89 and on Epson Premium Photo Glossy, the OD was 2.26. Excellent durability was of the prints was also observed.

The invention claimed is:

1. A method of making an encapsulated pigment comprising steps of:
    a) dispersing a pigment using a polymeric dispersant in an aqueous vehicle wherein the polymeric dispersant is selected from the group consisting of acrylic dispersant comprising acrylic and acrylate monomers and polyurethane dispersant and mixtures thereof and wherein the polymeric dispersant has a number average molecular weight of 2,000 to 9,500 daltons;
    b) adding at least one encapsulation monomer and at least one aqueous polyurethane dispersion to the aqueous vehicle of step (a) to form a first dispersed pigment/encapsulation monomer/polyurethane dispersion/aqueous mixture and wherein the encapsulation monomer comprises acrylate monomers;
    c) dispersing the encapsulation monomer/aqueous mixture using high shear mixing to form a second dispersed pigment/encapsulation monomer/aqueous polyurethane dispersion /aqueous mixture; and
    d) polymerizing the encapsulation monomer by adding a polymerization initiator to the second dispersed pigment/encapsulation monomer/aqueous polyurethane dispersion/aqueous mixture.

2. The method of claim 1, wherein the encapsulation monomer and the aqueous polyurethane dispersion are mixed together prior to addition to the dispersed pigment in the aqueous vehicle.

3. The method of claim 1, wherein the weight ratio of said encapsulation monomer to said pigment is from 0.1 to 10.

4. The method of claim 1, wherein the aqueous polyurethane dispersion is from 10 to 75 weight percent polyurethane solids and weight ratio of the polyurethane solids to encapsulation monomer is from 0.1 to 10.

5. The method of claim 1, wherein the encapsulation monomer comprises at least one selected from the group consisting of benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, glycidyl acrylate, p-tolyl acrylate, sorbyl acrylate, ethoxytriethyleneglycol methacrylate, hydroxyethyl methacrylate, hydroxypropyl methacrylate, 2-ethoxyethyl methacrylate, hydroxyethyl acrylate, hydroxypropyl acrylate, and mixtures thereof.

6. The method of claim 1, wherein the encapsulation monomer further comprises an acrylic monomer that is at most 20 weight percent of the acrylate monomer.

7. The method of claim 6, wherein the acrylic monomer is selected from the group consisting of methacrylic acid, acrylic acid, maleic acid, maleic acid monoester, itaconic acid, itaconic acid monoester, crotonic acid, crotonic acid monoester, N,N-dimethylaminoethyl methacrylate, N,N-diethylaminoethyl methacrylate, N,N-dimethylaminoethyl acrylate, N,N-diethylaminoethyl acrylate, t-butylaminoethyl methacrylate, t-butylaminoethyl acrylate and mixtures thereof.

8. The method of claim 1, wherein the encapsulation monomer further comprises at least one vinyl monomer which is at most 20 weight percent of the acrylate monomer, said vinyl monomer is selected from the group consisting of styrene, alpha-methyl styrene, substituted styrenes, N-alkyl acrylamides, N-alkyl methacrylamides, vinyl acetate, vinyl butyrate, vinyl benzoate, and mixtures thereof.

9. The method of claim 1, wherein the polymeric dispersant is substituted with crosslinkable moieties where the crosslinkable moieties are selected from the group consisting of acetoacetoxy, acid, amine, epoxy, hydroxyl, blocked isocyanates and mixtures thereof.

10. The method of claim 9, wherein the polymeric dispersant substituted with crosslinkable moieties is reacted with a crosslinking agent where the crosslinking agent is chosen from acetoacetoxy, acid, amine, anhydride, epoxy, hydroxyl, isocyanates, blocked isocyanates and mixtures thereof.

11. The method of claim 1, where the polymeric dispersant is crosslinked after the pigment is dispersed and before the encapsulation monomer is added.

12. The method of claim 1, wherein the polyurethane in the aqueous polyurethane dispersion has a number average molecular weight of 2000 to 50,000 daltons.

13. The method of claim 1, wherein the polyurethane in the aqueous polyurethane dispersion has an acid number of 10 to 75 mg KOH/gram of the polyurethane solids of the polyurethane dispersion.

14. The method of claim 1, wherein the polyurethane of the aqueous polyurethane dispersion comprises a diol, a diol with an ionic substituent, and a diisocyanate,
wherein the molar amount of isocyanate from the diisocyanate exceeds the molar amount of the isocyanate-reactive groups of the diol and the diol with the ionic substituent.

15. The method of claim 1, wherein the pigment of step (a) is purified prior to adding the encapsulation monomer and the aqueous polyurethane dispersion.

16. The method of claim 15, wherein said pigment is purified by ultrafiltration.

17. The method of claim 1, wherein the polymeric dispersant is a structured polymeric dispersant selected from the group consisting of block polymer dispersant, branched polymer dispersant, graft star polymer dispersant, and mixtures thereof.

18. A method of making an encapsulated pigment comprising the steps of:

a) dispersing a pigment using a first polymeric dispersant in an aqueous vehicle, wherein the first polymeric dispersant comprises acrylic and acrylate monomers and wherein the first polymeric dispersant has a number average molecular weight of 2000 to 9500 daltons;
b) preparing an aqueous emulsion comprising at least one encapsulation monomer, and least one aqueous polyurethane dispersion and a surfactant or a second polymeric dispersant, wherein the second polymeric dispersant comprises acrylic and acrylate monomers and wherein the encapsulation monomer comprises acrylate monomers;
c) adding the aqueous emulsion of step (b) to the aqueous vehicle of step (a) to form a first dispersed pigment/encapsulation monomer/aqueous polyurethane dispersion/aqueous mixture;
d) dispersing the encapsulation monomer/aqueous polyurethane dispersion/aqueous mixture using high shear mixing to form a second dispersed pigment/encapsulation monomer/aqueous mixture; and
e) polymerizing the encapsulation monomer by adding a polymerization initiator to the second dispersed pigment/encapsulation monomer/aqueous mixture.

19. The method of claim 18, wherein the encapsulation monomer comprises at least one selected from the group consisting of benzyl methacrylate, butyl methacrylate, methyl methacrylate, ethyl methacrylate, propyl methacrylate, hexyl methacrylate, 2-ethylhexyl methacrylate, octyl methacrylate, lauryl methacrylate, stearyl methacrylate, phenyl methacrylate, phenoxyethyl methacrylate, methacrylonitrile, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, phenoxyethyl acrylate, glycidyl acrylate, p-tolyl acrylate, sorbyl acrylate, ethoxy triethyleneglycol methacrylate, hydroxyethyl methacrylate, hydroxypropyl methacrylate, 2-ethoxyethyl methacrylate, hydroxyethyl acrylate, hydroxypropyl acrylate, and mixtures thereof.

20. An aqueous pigmented inkjet ink comprising the aqueous encapsulated pigment as set forth in claim 1, having from about 0.1 to about 10 wt % pigment based on the total weight of the ink, a weight ratio of pigment to dispersant of from about 0.33 to about 400, a surface tension in the range of about 20 dyne/cm to about 70 dyne/cm at 25° C., and a viscosity of lower than about 30 cP at 25° C.

21. The method of claim 1, wherein the encapsulation monomer comprises a dimethacrylate and/or trimethacrylate.

22. The method of claim 18, wherein the encapsulation monomer comprises a dimethacrylate and/or trimethacrylate.

* * * * *